United States Patent
Heitz et al.

(10) Patent No.: US 10,979,340 B2
(45) Date of Patent: Apr. 13, 2021

(54) LINK STATE ADDITION AND DELETION BASED ON RECEPTION OF A SINGLE MESSAGE IN LINK STATE VECTOR ROUTING

(71) Applicant: Cisco Technology, Inc., San Jose, CA (US)

(72) Inventors: Jakob Heitz, Santa Clara, CA (US); Alfred C. Lindem, III, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/505,377

(22) Filed: Jul. 8, 2019

(65) Prior Publication Data

US 2021/0014148 A1 Jan. 14, 2021

(51) Int. Cl.
*H04L 12/50* (2006.01)
*H04L 12/755* (2013.01)
*H04L 12/721* (2013.01)

(52) U.S. Cl.
CPC .......... *H04L 45/021* (2013.01); *H04L 45/123* (2013.01)

(58) Field of Classification Search
CPC ...................................................... H04L 12/50
USPC ......................................................... 370/400
See application file for complete search history.

(56) References Cited

U.S. PATENT DOCUMENTS

2020/0106696 A1\* 4/2020 Michael ................. H04L 45/22

OTHER PUBLICATIONS

Gredler et al., "North-Bound Distribution of Link-State and Traffic Engineering (TE) Information Using BGP," Internet Engineering Task Force (IETF)—Request for Comments: 7752, Junpier Networks, Inc., Mar. 2016.
K. Patel, et. al., "Shortest Path Routing Extensions for BGP Protocol," Network Working Group—Internet-Draft, Aug. 6, 2018.
Moy, J. "Extending OSPF to Support Demand Circuits," Network Working Group—Request for Comments:1793, Apr. 1995.

\* cited by examiner

*Primary Examiner* — Dang T Ton
(74) *Attorney, Agent, or Firm* — Patterson + Sheridan, LLP

(57) ABSTRACT

Techniques for updating a routing table based on a single message are described. One technique includes receiving at a first network device a node message from a second network device. The node message includes a sequence number and a list of link state(s) originated by the second network device. The first network device determines whether to withdraw one or more link states originated by the second network device and maintained in a routing table of the first network device based on the sequence number and the list of the link state(s) within the node message. The routing table is updated based on the determinations.

20 Claims, 11 Drawing Sheets

US 10,979,340 B2

LINK STATE ADDITION AND DELETION BASED ON RECEPTION OF A SINGLE MESSAGE IN LINK STATE VECTOR ROUTING

TECHNICAL FIELD

Embodiments presented in this disclosure generally relate to network communication and, more specifically, to improved techniques for updating a routing table (e.g., adding and withdrawing link states in the routing table) based on a single advertisement message in a routing protocol (e.g., link state vector routing).

BACKGROUND

Today, many large data centers (e.g., massively scaled data centers (MSDCs)) employ link state vector routing (LSVR) protocols for routing traffic (e.g., packets) within a large network. Compared to distance-vector routing protocols, in a LSVR protocol, each node constructs a map of the connectivity to the network in the form of a graph, showing which nodes are connected to which other nodes. Each node then independently calculates the next best logical path from it to every possible destination in the network. Each node's collection of best paths forms that node's routing table.

Data centers generally use interior gateway protocols, such as Open Shortest Path First (OSPF) and Intermediate System-Intermediate System (IS-IS), to select and distribute routing information. Today, as data centers steadily grow to host an increasing number of endpoints, data centers are increasingly transitioning to using an exterior gateway protocol, such as Border Gateway Protocol (BGP), as their single routing protocol for both routing traffic within the network fabric and for routing traffic over a data center interconnect (e.g., between data centers).

In LSVR protocols, BGP can be used to collect the link state database information of each LSVR node in the network. For example, similar to OSPF and IS-IS, LSVR can use BGP to distribute link states and use the shortest-path-first (SPF) algorithm to compute routes. However, one challenge with using BGP is that LSVR generally uses explicit BGP withdrawal messages to delete links. This can lead to scalability issues in large data centers, reducing the efficiency of LSVR in large data centers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
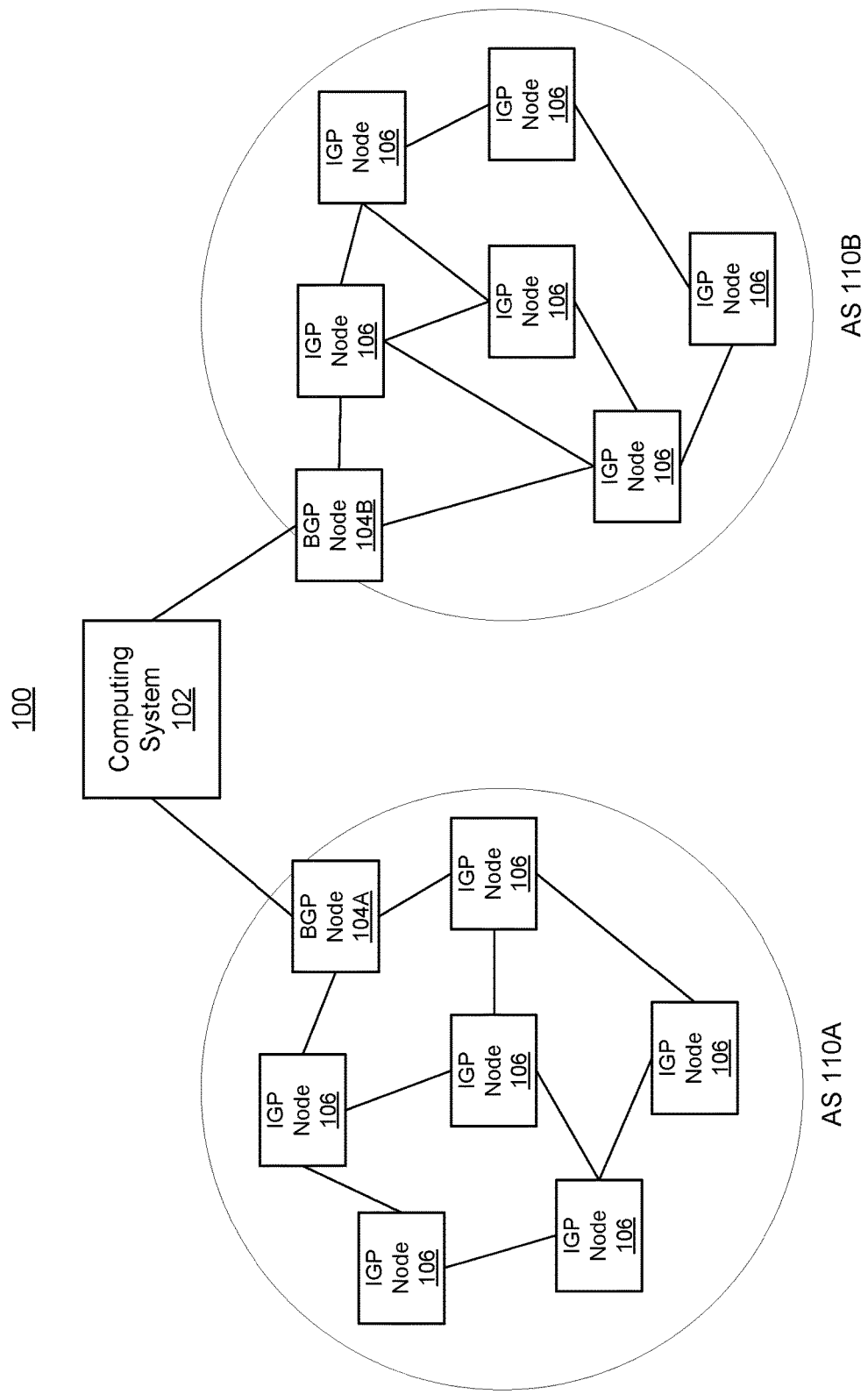
FIG. 1 illustrates an example network topology, according to one embodiment.

One example embodiment provides a method that includes receiving, at a first network device, a first node message from a second network device. The first node message includes (i) a first sequence number and (ii) a first list of one or more link states originated by the second network device. The method also includes identifying, by the first network device, a set of link states originated by the second network device that are maintained in a routing table of the first network device. The method further includes determining, by the first network device for each of the link states maintained in the routing table, whether to withdraw the link state in the routing table based at least in part on the first sequence number and the first list within the first node message. The method further yet includes updating, by the first network device, the routing table based on the determinations.

Another example embodiment provides a first network device that includes a processor, a routing table including a set of link states originated by at least a second network device, and a memory containing a program that, when executed by the processor, performs an operation. The operation includes receiving a first node message from the second network device. The first node message includes (i) a first sequence number and (ii) a first list of one or more link states originated by the second network device. The operation also includes determining, for each of the link states in the routing table, whether to withdraw the link state in the routing table based at least in part on the first sequence number and the first list within the first node message. The operation further includes updating the routing table based on the determinations.

Another example embodiment provides a method that includes receiving, at a first network device, a link message from a second network device. The link message includes (i) an indication of a first link state originated by the second network device and (ii) an indication of a first sequence number associated with a first list of one or more link states, including the first link state, originated by the second network device. The method also includes determining, by the first network device, that the first link state is absent from a second list of one or more link states originated by the second network device. The second list is stored at the first network device. The method further includes determining, by the first network device, that the first list has a younger age than the second list. The method further yet includes, after determining that (i) the first link state is absent from the second list and (ii) the first list has a younger age than the second list, updating a routing table at the first network device based on the link message.

Example Embodiments

In LSVR (with BGP), BGP link state (LS) Network Layer Reachability Information (NLRI) (BGP-LS NLRI) are originated individually by each network node (e.g., network device, such as a router, switch, etc.). For example, assuming a first network node (e.g., router A) has three link states, the first network node (implementing LSVR with BGP) may send three different NLRIs, each for a different one of the three links. In addition, because LSVR with BGP uses withdraw messages to delete link states, nodes generally have to store knowledge about every neighbor from which it has received a particular link state, e.g., to account for node failure events. For example, assume that a first node that has advertised link state(s) goes down. In this case, the first node cannot send withdrawal messages, meaning that the node down (or failure) event implicitly withdraws all of the link states the first node has announced.

These properties of LSVR can cause significant scalability problems for a large data center. For example, a node typically has to store a copy of a link state for each neighbor that it has received the link state from. For some large data centers (e.g., MSDC), each node may have to store on the order of millions of link states (e.g., a hundred million link states). Additionally, these properties can cause significant convergence problems, e.g., in the case of a link failure for LSVR. For example, before a node can delete its own copy of a link state, every neighbor from which it has received a copy has to withdraw the link state first. In other words, the node has to wait for the last withdrawal to arrive before it can delete that link from its topology.

To address the above issues, embodiments provide techniques that allow for a single message to be sent to any neighbor node to trigger the deletion or addition of a link state at that neighbor node. More specifically, embodiments provide a new set of information elements that can be used within LSVR to trigger the deletion of a link state with a single message and/or the addition of a link state with a single message. As described further below, the information elements can include a link identifier (ID), a summary originated link state (SOLS), and a SOLS sequence number (SN) (SOLS-SN). In one embodiment, each information element may be included within an attribute Type-Length-Values (TLVs) triplet. For example, the link ID may be a link attribute TLV that is used to identify the link state originated by a network node. The SOLS may be a node attribute TLV that includes a list of all the link states (e.g., a list of all the link IDs) originated by a network node. The SOLS-SN may be a link attribute TLV or node attribute TLV that indicates the age of the SOLS that lists the link state.

In one embodiment herein, a first network node can trigger another second network node to add a link state originated by the first network node (e.g., for a new link identified/detected by the first network node) by generating a frame (or message) (e.g., BGP-LS NLRI) that includes an identifier of the link state (e.g., link ID) and an indication (e.g., a copy) of the sequence number (e.g., SOLS-SN) associated with the SOLS that includes the link state, and transmitting the frame to the second network node. Upon receiving the frame, the second network node can add the link state to a routing table (at the second network node) after determining that the sequence number is greater than (e.g., newer or younger) the sequence number of a previous SOLS received from the first network node that does not list the link state.

In another embodiment herein, a first network node can trigger another second network node to delete a link state (and link) by generating a SOLS that (1) does not list the link ID corresponding to the link state and (2) has a sequence number (e.g., SOLS-SN) that is greater than the sequence number of a last SOLS (that does list the link ID corresponding to the link state) originated by the first network node and transmitted to the second network node. Upon receiving the SOLS, the second network node can determine whether to delete the link, based on the SOLS and sequence number. For example, if the second network node determines that the SOLS satisfies (1) and (2), the second network node can delete the corresponding link and link state from the routing table at the second network node.

In this manner, embodiments enable each network node implementing LSVR to store a single copy (e.g., as opposed to multiple copies) of a link state, regardless of which neighbors the node has received the link state from. That is, the improved LSVR techniques described herein do not require nodes to remember from which neighbors a link state is received from. Doing so can substantially reduce the scalability and/or convergence problems associated with conventional LSVR techniques.

Note that many of the following embodiments use attribute TLV triplets as a reference example of a format that can be used to include (or encode) the new information elements (e.g., link ID, SOLS, SOLS-SN, etc.) described herein into a BGP-LS NLRI. Note, however, that the techniques described herein are not limited to attribute TLVs, and that the information elements can be encoded into a BGP-LS NLRI using other encoding schemes and/or formats. For example, techniques described herein can use an encoding format based on, but not limited to, Abstract Syntax Notation One (ASN.1) (e.g., Basic Encoding Rules (BER), Distinguished Encoding Rules (DER), Canonical Encoding Rules (CER), Packed Encoding Rules (PER), XML Encoding Rules (XER), JSON Encoding Rules (JER), etc.), Concrete Syntax Notation One (CSN.1), a TCP/IP-based protocol, etc.

FIG. 1 illustrates an example network 100 in which aspects of the present disclosure may be practiced, according to one embodiment. For example, the techniques described herein allow for the BGP nodes 104A, 104B, and LSVR nodes 106 in autonomous systems (ASs) 110A and 110B to obtain and distribute link state information using BGP. Each AS 110 includes one or more LSVR nodes 106 and one or more BGP nodes 104. The LSVR nodes 106 and the BGP nodes 104 can include various network devices, such as routers, switches, etc.

As opposed to using an IGP (e.g., OSPF, IS-IS) to distribute link state information within the AS 110, each of the LSVR nodes 106 and/or BGP nodes 104 can implement LSVR with BGP (or BGP-LS) to distribute link state information within the AS 110. In some embodiments, the BGP nodes 104 can also implement LSVR with BGP to distribute link state information across ASs 110A and 110B. As described further below, each LSVR node 106 and/or BGP node 104 can use a BGP NLRI encoding format (e.g., BGP-LS NLRI) to carry link state information in BGP. The BGP-LS NLRI is used to describe a node, a link, or a prefix.

In particular, the identifying key of each link state object (e.g., node, link, or prefix) is encoded in the NLRI and the properties (e.g., link, node, prefix parameters, and attributes) of the link state object are encoded in a BGP link state attribute TLV. The BGP-LS NLRI format and the attribute TLV formats are described in more detail below (e.g., with reference to FIGS. 3-6).

In the particular embodiment depicted in FIG. 1, the BGP nodes 104A and 104B are connected to a computing system 102. In one embodiment, the computing system 102 is representative of one or more route reflectors, which are configured to obtain link state information from each of the ASs 110A and 110B. In another embodiment, the computing system 102 can include multiple components (e.g., a controller coupled to one or more route reflectors).

Figure 2:
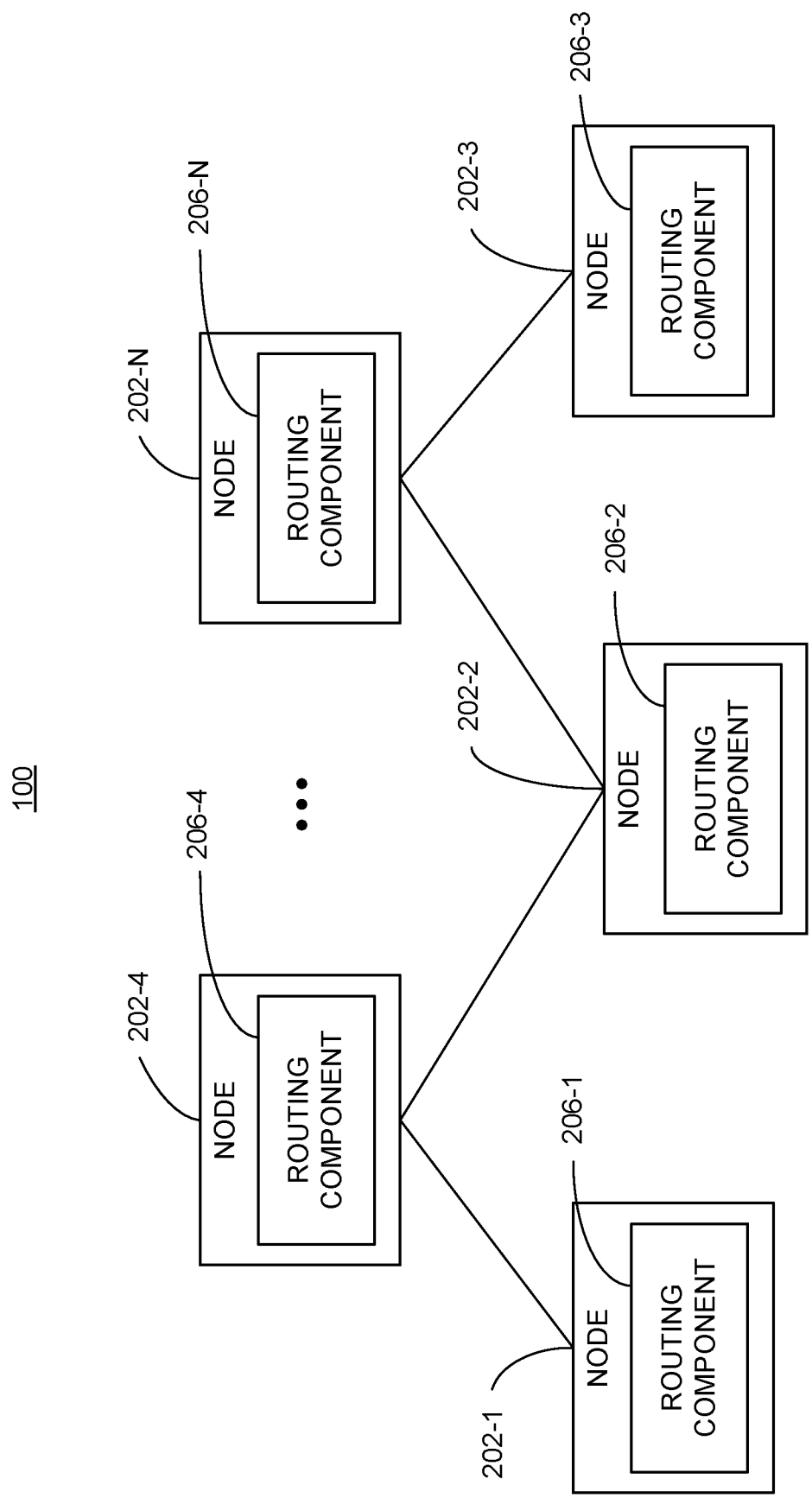
FIG. 2 illustrates an example deployment of network nodes, each configured with a routing component, according to one embodiment.

FIG. 2 illustrates an example deployment of network nodes 202 1-N, each configured with a respective routing component 206 1-N, according to one embodiment. The network nodes 202 are representative of various network devices, e.g., routers, switches, etc. In one embodiment, the network nodes 202 can be representative of one or more of the LSVR nodes 106 and BGP nodes 104 depicted in FIG. 1.

As shown, each network node 202 includes a routing component 206. The routing component 206 can be a software application executing on the network node 202. In one embodiment, the routing component 206 implements a routing protocol, such as LSVR using BGP. With LSVR, each routing component 206 describes itself (e.g., the network node) and its interfaces (e.g., links/link states) to other nodes (e.g., network devices, networks, etc.). This information is then passed unchanged from network node to network node, such that every network node in the network can determine the entire network topology. Using one of the links depicted in FIG. 2 as a reference example, the routing component 206-1 can send a BGP-LS NLRI indicating that network node 202-1 is connected to network node 202-4, network node 202-4 can forward the BGP-LS NLRI to its neighbor (e.g., network node 202-2); network node 202-2 can forward the BGP-LS NLRI to its neighbors (e.g., network nodes 202-5 to 202-N); and so on, until each network node 202 in the network has knowledge that network node 202-1 is connected to network node 202-4.

The routing component 206 is configured to use the new information elements described herein in order to add a link state and/or delete a link state using a single message. As noted, the information elements can include a link ID, a SOLS, and a SOLS-SN. In one embodiment, by using the information elements, the routing component 206 is able to maintain a single copy of a link state for a corresponding link. In addition, the routing component 206 can avoid sending withdrawal messages to other routing components 206 in order to delete a link state and avoid processing withdrawal messages that are received at the routing component 206.

Rather, to delete (or withdraw) a link state, the (originating) (first) routing component 206 can send a SOLS that no longer lists the link state originated by the first routing component 206. If, at the receiving (second) routing component 206, (1) a link state (originated by the first routing component) exists which has a SOLS-SN=X, (2) a SOLS from the same originator exists with a SOLS-SN=Y, (3) the SOLS in (2) does not list the link state, and (4) Y>X (where > indicates a younger age), then the receiving routing component 206 can delete the link state from its routing table. Conditions (1)-(4) ensure that a link state is deleted in situations when a SOLS exists, the SOLS is not older than the link state, and the SOLS does not list the link state. Additionally, from conditions (1)-(4), it follows that if a link comes up, only the BGP-LS NLRI has to be sent. That is, embodiments do not require an updated SOLS to be generated whenever a new link comes up. In this manner, embodiments enable network nodes to add and/or delete a link state, using a single message.

Figure 3:
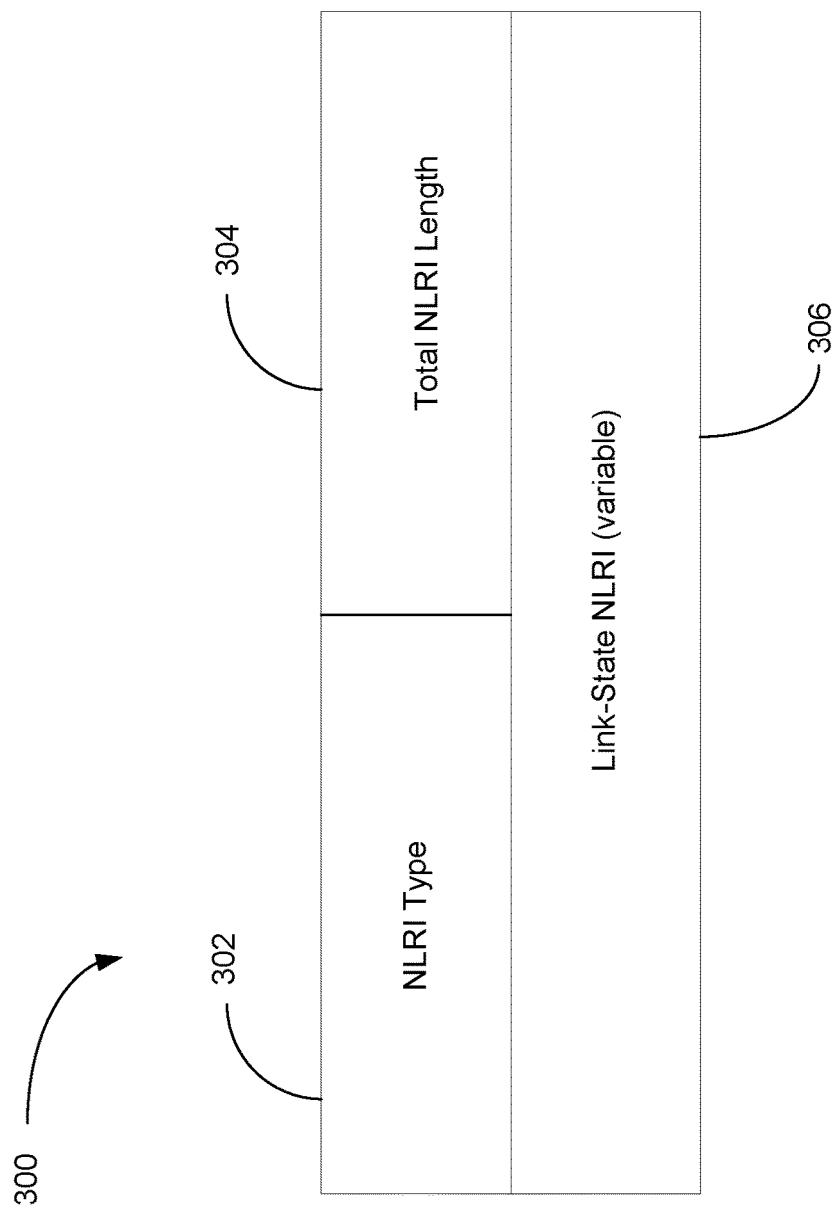
FIG. 3 illustrates an example format of an information element used to carry link state and network node information, according to one embodiment.

FIG. 3 depicts an example format 300 of a BGP-LS NLRI, which can be used to carry link state and/or network node information with BGP, according to one embodiment. As shown, the format 300 is a TLV format and includes a NLRI Type field 302, a total NLRI length field 304, and a Link-State NLRI field 306. The total NLRI length field 304 includes the length (e.g., in octets) of the Link-State NLRI field 306. The NLRI Type field 302 indicates whether the Link-State NLRI field 306 will be used to describe a node (e.g., a Node NLRI), a link (e.g., a Link NLRI), or a prefix (e.g., IPv4/IPv6 Topology Prefix NLRI).

When the NLRI Type field 302 indicates a node, the Node NLRI format includes a protocol ID field, an identifier field (e.g., 8 octets), and one or more local node descriptors (e.g., variable size). When the NLRI Type field 302 indicates a link, the Link NLRI includes a protocol ID field, an identifier field (e.g., 8 octets), one or more local node descriptors (e.g., variable size), one or more remote node descriptors (e.g., variable size), and one or more link descriptors (e.g., variable size). The protocol ID field can be used to indicate the NLRI information source protocol (e.g., routing protocol). The local node descriptors can include node descriptors for the node anchoring the local end of the link and the remote node descriptors include node descriptors for the node anchoring the remote end of the link. The node descriptors (e.g., in the local and remote node descriptors) can indicate an autonomous system, BGP link state identifier, etc.

The link descriptors uniquely identify a link among multiple parallel links between a pair of network nodes. In some embodiments, a link described by a link descriptor may correspond to a "half-link," (e.g., a unidirectional representation of a logical link). In these cases, in order to fully describe a link, two originating network nodes can advertise a half-link each, e.g., two Link NLRIs are advertised for a given point-to-point link. In one embodiment, the information about a link that is included in the BGP-LS NLRI originated by the local node of the link determines the set of TLVs in the link descriptor of the link.

Figure 4:
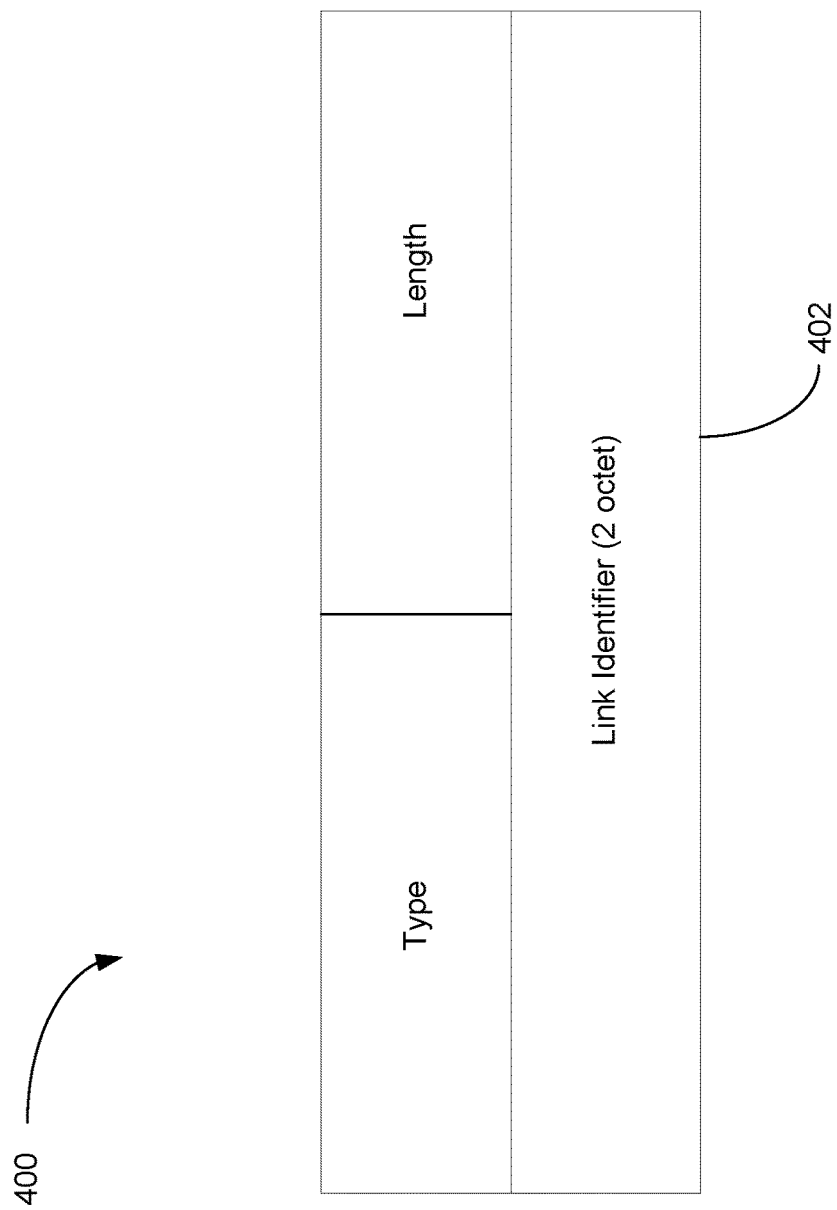
FIG. 4 illustrates an example format of an attribute Type-Length-Value, according to one embodiment.
Figure 5:
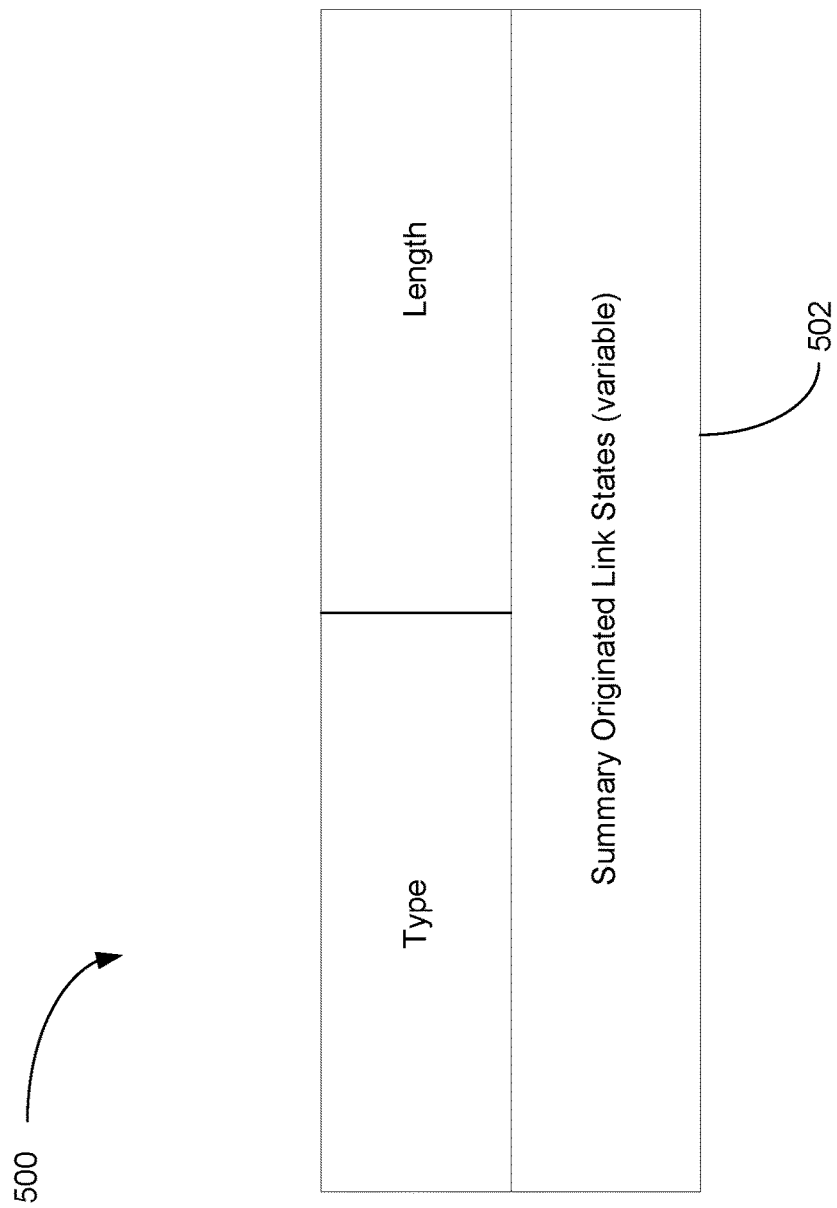
FIG. 5 illustrates an example format of another attribute Type-Length-Value, according to one embodiment.
Figure 6:
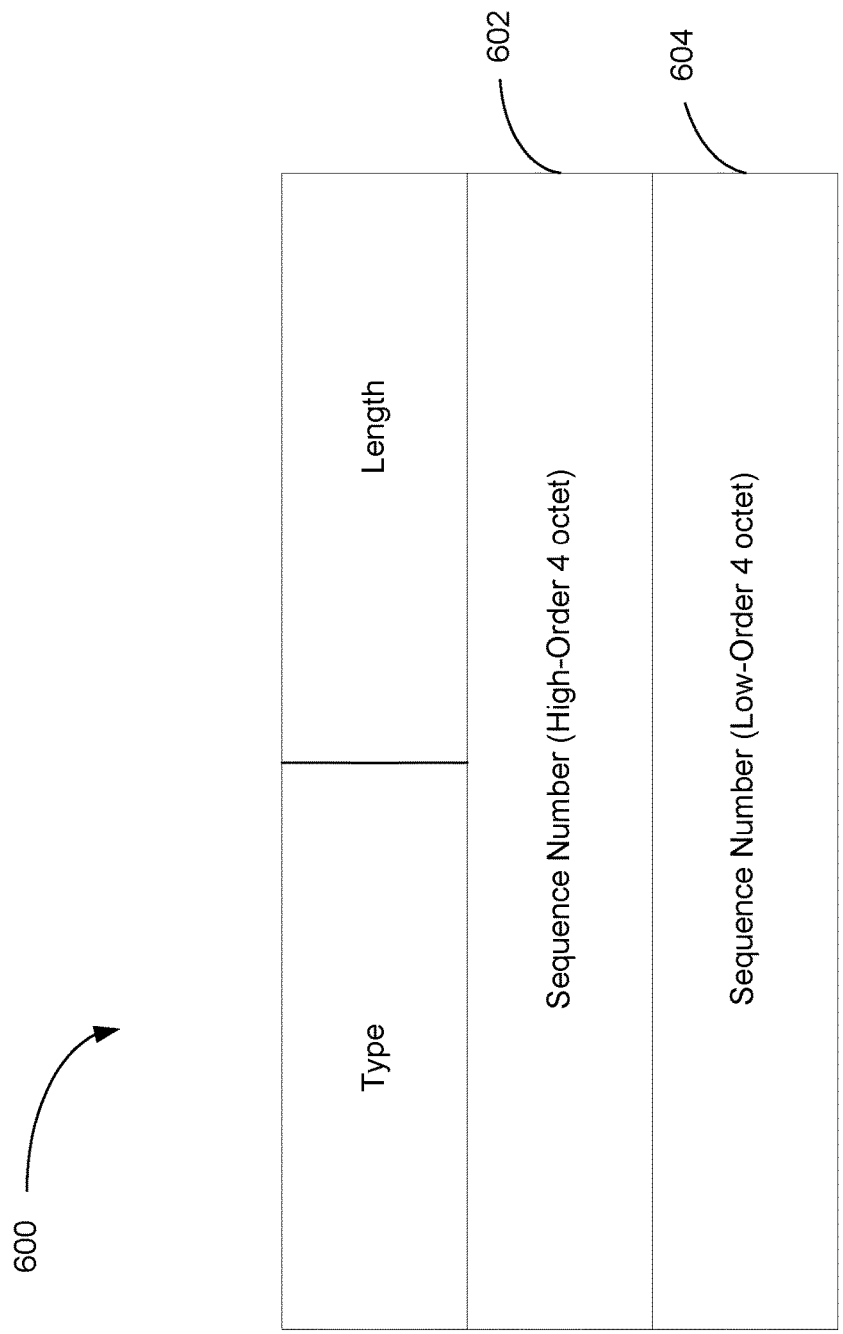
FIG. 6 illustrates an example format of yet another attribute Type-Length-Value, according to one embodiment.

In embodiments herein, a BGP-LS attribute can be used to carry link, node, prefix parameters, and attributes of the BGP-LS NLRI (e.g., format 300). The BGP-LS attribute is a set of attribute TLVs that can be included within the BGP-LS NLRI. The set of attribute TLVs can include node attribute TLVs, link attribute TLVs, etc. FIGS. 4-6 illustrate example new attribute TLV formats that can enable the addition or deletion of a link state in LSVR with BGP.

Referring initially to FIG. 4, FIG. 4 depicts an example format 400 of a link attribute TLV that can be included within (or as part of or attached to) a Link NLRI (or link advertisement message) (e.g., a BGP-LS NLRI with a NLRI Type field 302 set to "Link"). As shown, the link attribute TLV includes a link ID field 402. The link ID field 402 is a two-octet number that identifies the link state of the originating network node (e.g., the network node that originates the link state). In one embodiment, the value of the link ID is unique within the set of link states originated by a network node. In some embodiments, the value of the link ID may not be unique across different link state sets from different network nodes (e.g., network node A has link ID A to identify a link state originated by network node A, and network node B also has link ID A to identify a link state originated by network node B). In one embodiment, the link ID may remain constant if the properties of the owning link state are changed. That is, the link ID may be persistent across reboots of a network node.

FIG. 5 depicts an example format 500 of a node attribute TLV that can be included within (or as part of or attached to) a Node NLRI (or node advertisement message) (e.g., a BGP-LS NLRI with a NLRI Type field 302 set to "Node"). As shown, the node attribute TLV includes a SOLS field 502 of variable length. The SOLS field 502 includes a list of all the link states (e.g., link IDs) that are originated by a network node.

FIG. 6 depicts an example format 600 of an attribute TLV that can be included within (or as part of or attached to) a Link NLRI and/or a Node NLRI, according to one embodiment. As shown, the attribute TLV includes a first sequence number field 602 and a second sequence number field 604. In one embodiment, the attribute TLV can be used as a link attribute TLV that is included as part of a Link NLRI. In this embodiment, the sequence number (represented by combined fields 602 and 604) represents the sequence number (e.g., SOLS-SN) of the Node NLRI that includes the SOLS that lists the respective link state originated by a network node. In another embodiment, the attribute TLV can be used as a node attribute TLV that is included as part of a Node NLRI. In this embodiment, the sequence number (represented by combined fields 602 and 604) indicates the age of the Node NLRI, which may or may not include a SOLS. The sequence number in the format 600 is a monotonically increasing sequence number that is preserved across reboots. In one embodiment, the sequence number is incremented for each Node NLRI originated by a network node (e.g., reflecting the latest version of the SOLS).

As noted, each network node can use the attribute TLVs described with respect to FIGS. 4-6 to add or delete link states via a single message (e.g., a single link advertisement message (i.e., BGP-LS NLRI) in the case of adding a link state and a single node advertisement message (with a SOLS) in the case of deleting a link state). For example, assume that a first network node (e.g., network node 202) issues one or more link advertisement messages (e.g., one or more Link NLRIs) and a single SOLS (e.g., a Node NLRI). In this example, each link advertisement message includes a link ID and a SOLS-SN that indicates the latest version (e.g., age) of the SOLS at the time that the link advertisement message was originated (or updated). Also in this example, the SOLS includes a sequence number and a list of the link IDs of all the link states that were valid at the time the SOLS was generated by the first network node.

Further assume that a second network node (e.g., network node 202) receives the one or more link advertisement messages from the first network node. At the second network node, the one or more link advertisement messages may fall into two categories: (1) the SOLS-SN is greater than (e.g., newer or younger than) the sequence number of the most recently received SOLS generated by the first network node; or (2) the SOLS-SN is less than or equal to (e.g., older than or has the same age as) the sequence number of the most recently received SOLS generated by the first network node. The second network node can determine that the link advertisement messages from the first network node that satisfy (1) are valid (e.g., as long as the first network node is reachable). That is, the link advertisement messages that satisfy (1) do not have to be mentioned in the latest SOLS from the first network node. On the other hand, the second network node can determine that the link advertisement messages from the first network node that satisfy (2) are valid as long as they are listed in the most recent SOLS received from the first network node.

In the above scenario, the first network node has to generate a new SOLS whenever it wants to delete a link state, but the first network node does not need to generate a new SOLS whenever it generates a new link state (or updates an existing link state). Rather, the first network node can just send a link advertisement message indicating that the SOLS-SN is newer than the last SOLS generated by the first network node in order to add a link state. Thus, in either case of a link up or link down event, the first network node can send a single message to update a routing table based on the event.

In some embodiments, both the Link NLRI and the Node NLRI may be deleted after their originator has been unreachable for a predefined period of time. In one embodiment, the predefined period of time may be based on the amount of time it takes to fully flood updates in a network if all the network nodes in the network were to flood at the same time. In at least one case, the predefined period of time can be on the order of minutes. Further, in some embodiments, there may be situations in which a network node receives a Node NLRI with a SOLS that lists a link state that does not yet exist. This, for example, can happen when the Node NLRI arrives at the network node prior to the Link NLRI (that includes the link ID of the link state), due in part to flood reduction strategies. However, the techniques presented herein can still be used in such cases.

Figure 7:
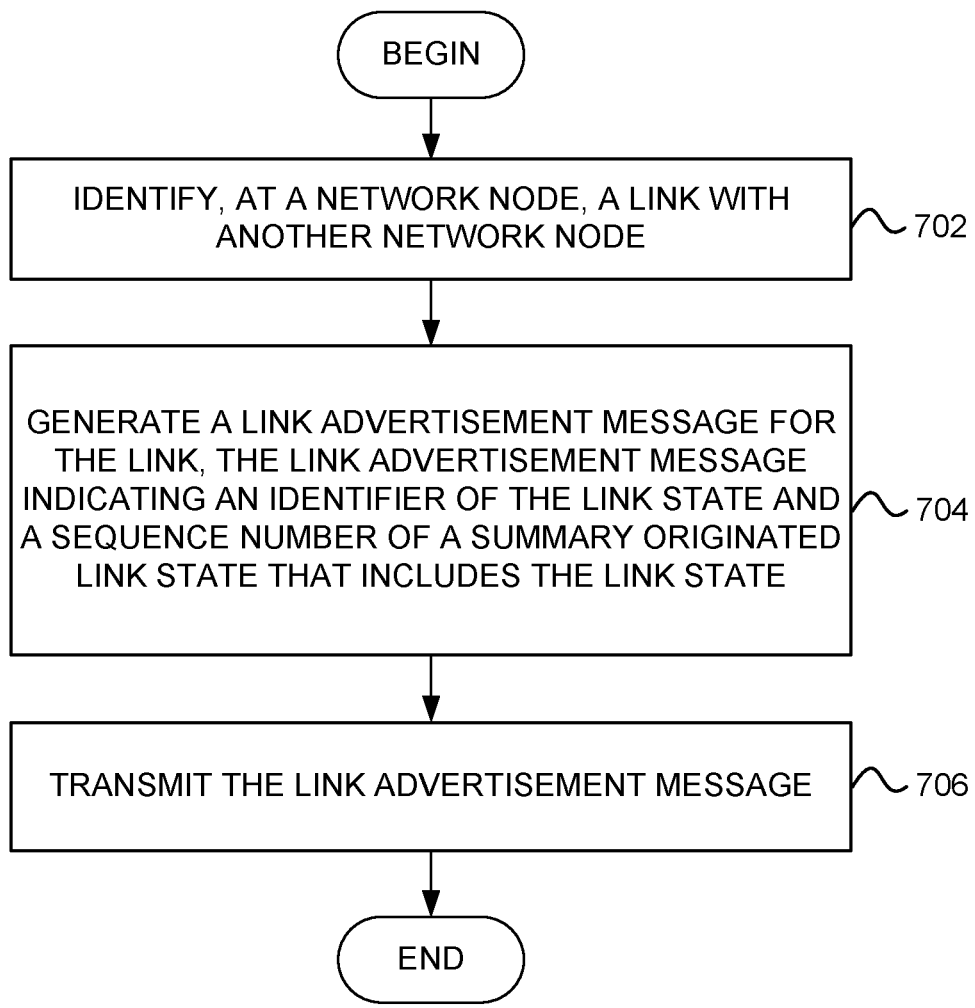
FIG. 7 is a flowchart of a method for adding a link state with a single link advertisement message, according to one embodiment.

FIG. 7 is a flowchart of a method 700 for adding (or updating) a link state with a single message, according to one embodiment. The method 700 may be performed by a (first) network node (e.g., network node 202) configured with a routing component (e.g., routing component 206).

As shown, the method 700 begins at block 702, where the (first) network node identifies (or discovers) a link with another (second) network node. The network node and the other network node are neighboring nodes. In one embodiment, the link may be a link that is newly (or initially) established between the network node and the other network node (e.g., the first network node and/or the second network node may have powered up after a reboot). In one embodiment, the link may be a link that has undergone a status change (e.g., from inactive to active, or vice versa).

At block 704, the network node generates a link advertisement message (e.g., BGP-LS NLRI) for the link. The link advertisement message indicates an identifier of the link state (e.g., link ID) and a sequence number (e.g., SOLS-SN) associated with a SOLS (originated by the network node) that includes the link state (e.g., the SOLS lists the link ID). In one example, the SOLS-SN is the sequence number of the node advertisement message that includes the SOLS that lists the link state.

In one embodiment, the network node can use a Link NLRI format (e.g., a BGP-LS NLRI having a NLRI Type field that indicates "Link") for the link advertisement message. The network node can encode one or more link attribute TLVs into the Link NLRI format. For example, the Link NLRI format can include a first link attribute TLV (e.g., format 400) to indicate the link ID and a second link attribute TLV (e.g., format 600) to indicate the SOLS-SN. At block 706, the network node transmits the link advertisement message (e.g., to at least another (third) network node).

In some embodiments, the network node (as a part of method 700) can generate a node advertisement message (e.g., an advertisement message for the first network node) that includes the SOLS listing the link state. In this case, the network node can use a Node NLRI format (e.g., a BGP-LS NLRI having a NLRI Type field that indicates "Node") for the node advertisement message. The network node can encode one or more node attribute TLVs into the Node NLRI format. For example, the Node NLRI format may include at least one node attribute TLV (e.g., format 500) to indicate the SOLS and another node attribute TLV (e.g., format 600) to indicate a sequence number of the Node NLRI format. In one embodiment, the network node can refrain from transmitting the node advertisement message. In another embodiment, the network node can at least delay transmitting the node advertisement message (e.g., for a predefined amount of time after transmitting the link advertisement message).

Figure 8:
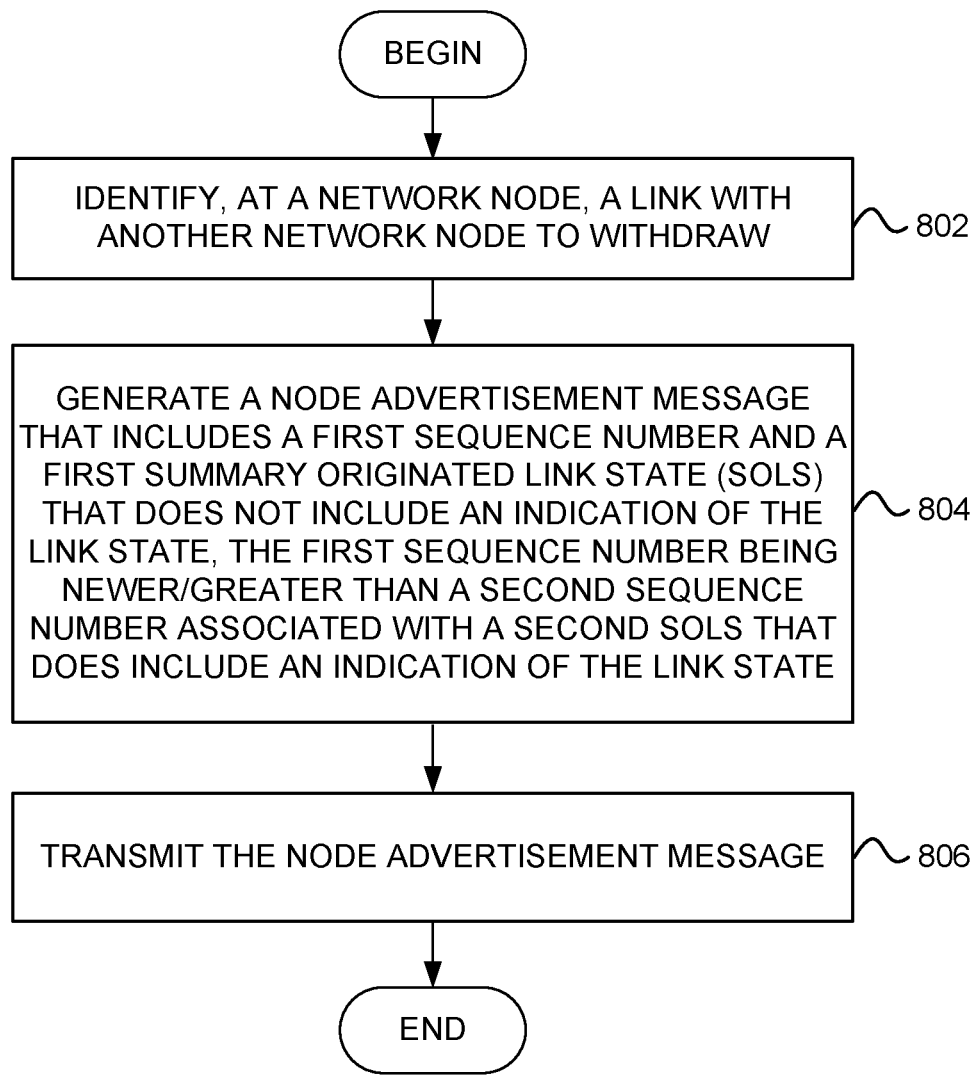
FIG. 8 is a flowchart of a method for deleting a link state with a single node advertisement message, according to one embodiment.

FIG. 8 is a flowchart of a method 800 for deleting (or withdrawing) a link state with a single message, according to one embodiment. The method 800 may be performed by a (first) network node (e.g., network node 202) configured with a routing component (e.g., routing component 206).

As shown, the method 800 begins at block 802, where the (first) network node identifies a link between the (first) network node and another (second) network node to withdraw. For example, in some cases, the link may no longer be present due to, e.g., link inactivity, a link failure, network node failure, network node removal, maintenance, etc.

At block 804, the network node generates a node advertisement message having a first sequence number and a first SOLS that does not include an indication of the link state (e.g., link ID). The first sequence number associated with the first SOLS is greater than (e.g., newer/younger than) a second sequence number associated with a second SOLS (originated by the network node) that does include an indication of the link state (e.g., link ID). In one embodiment, the sequence numbers of node advertisement messages are monotonically increasing. That is, the sequence number is increased (or incremented) for each node advertisement message generated (or originated) by the network node. In one embodiment, the sequence number in the node advertisement message is also protected against network node restarts/reboots. That is, the sequence number of the node advertisement message is preserved in cases where the network node has to restart (e.g., for maintenance, software updates, etc.).

In one embodiment, the network node can use a Node NLRI format (e.g., a BGP-LS NLRI having a NLRI Type field that indicates "Node") for the node advertisement message. The network node can encode one or more node attribute TLVs into the Node NLRI format. For example, the Node NLRI format can include a first node attribute TLV (e.g., format 500) to indicate the (first or second) SOLS and a second node attribute TLV (e.g., format 600) to indicate the sequence number (of the node advertisement message) associated with the (first or second) SOLS. At block 806, the network node transmits the node advertisement message (e.g., to at least another (third) network node).

Figure 9:
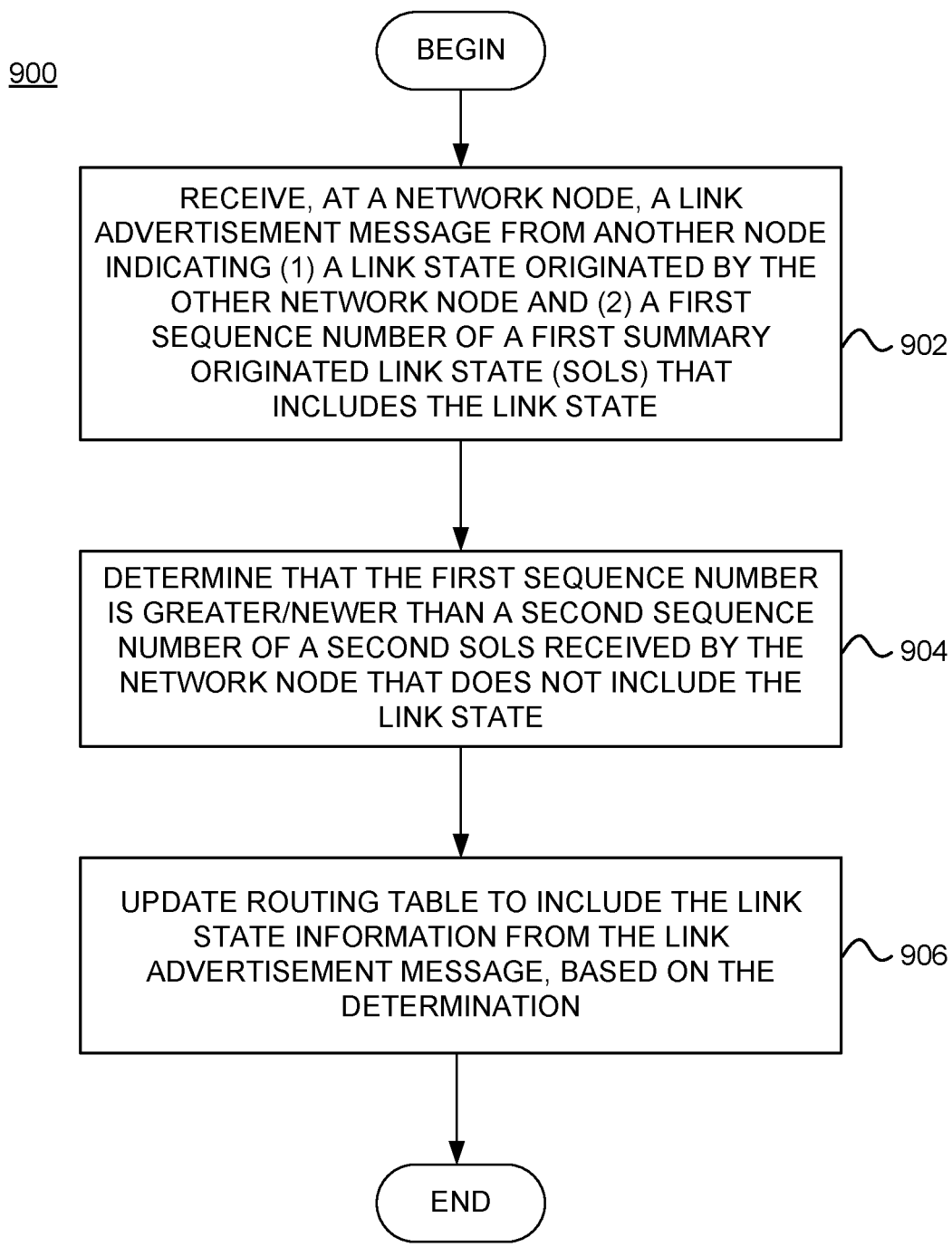
FIG. 9 is a flowchart of a method for processing a link advertisement message, according to one embodiment.

FIG. 9 is a flowchart of a method 900 for processing a link advertisement message, according to one embodiment. The method 900 may be performed by a (first) network node (e.g., network node 202) configured with a routing component (e.g., routing component 206). In one particular embodiment, the method 900 can be performed by a receiving (first) network node to add (or update) a link state, based on a single message (e.g., link advertisement message) received from another (second) network node. In one embodiment, the link advertisement message may have been generated and transmitted according to method 700 of FIG. 7.

As shown, the method 900 begins at block 902, where the (first) network node receives a link advertisement message from another (second) network node that includes an indication of a link state (e.g., link ID) originated by the other (second) network node. For example, the link advertisement message can indicate the link state of a link between the second network node and a third network node. The link advertisement message also includes a first sequence number (e.g., SOLS-SN) of a first SOLS (originated by the other (second) network node) that includes the link state.

At block 904, the network node determines that the first sequence number of the first SOLS is greater than (e.g., newer/younger than) a second sequence number of a second SOLS (previously received by the network node from the other network node). The second SOLS may be maintained at the network node (e.g., in a database). The network node (at block 904) also determines that the second SOLS does not include an indication of the link state (e.g., does not list the link ID).

At block 906, the network node updates a routing table (at the network node) to include the link state information of the link advertisement message, based on the determination (e.g., at block 904). For example, as noted, the network node may determine that the link state indicated by the link advertisement message is valid, even though the latest SOLS (e.g., second SOLS) received from the other network node does not list the link ID, as long as the first sequence number is newer (e.g., greater) than the second sequence number. In some cases, in addition to the first sequence number being newer than the second sequence number, the network node may have to determine that the other network node is still reachable, before determining that the link state indicated by the link advertisement message is valid. In one embodiment, the network node may later receive the first SOLS (e.g., in a node advertisement message) from the other network node after updating the routing table.

Figure 10:
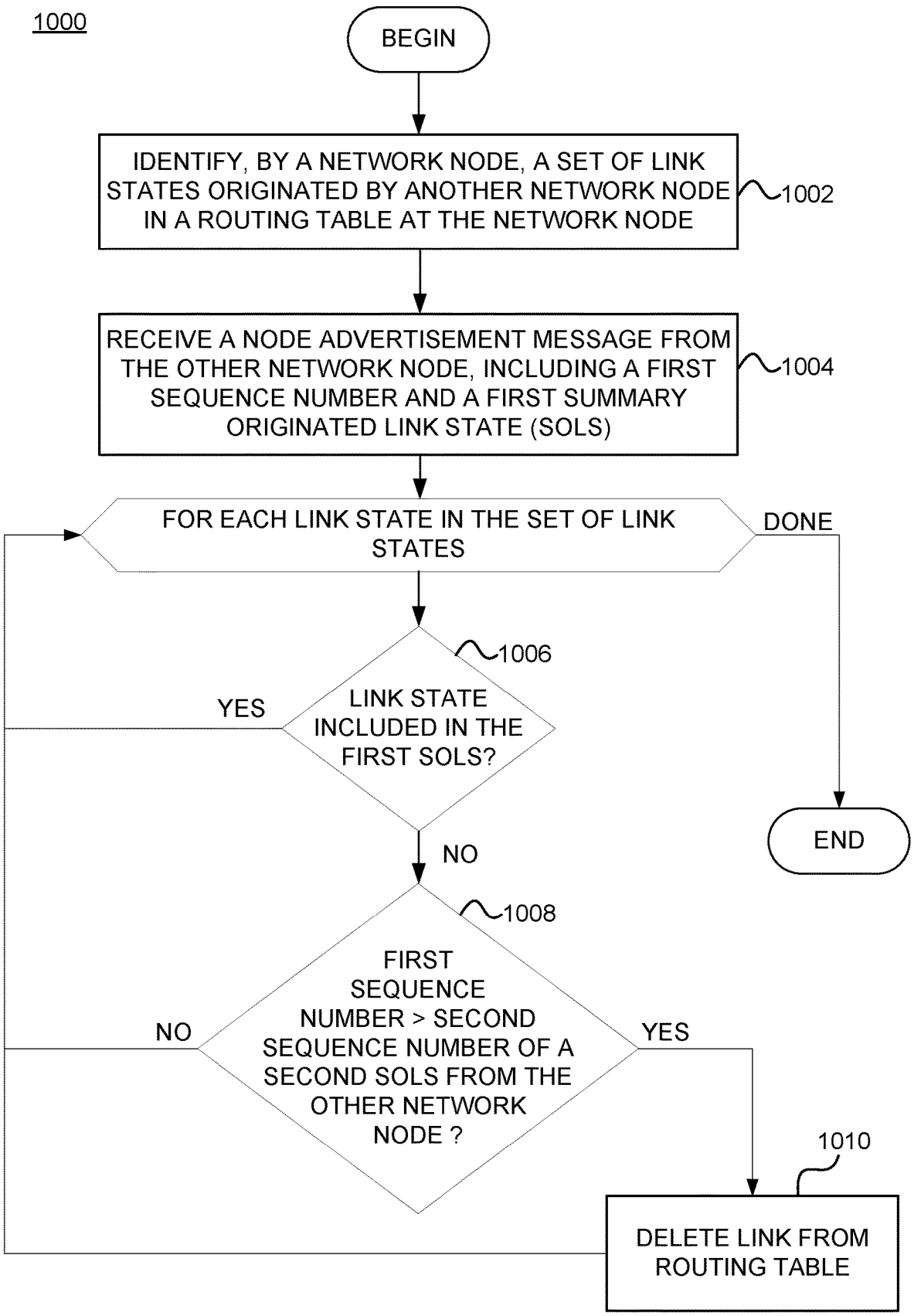
FIG. 10 is a flowchart of a method for processing a node advertisement message, according to one embodiment.

FIG. 10 is a flowchart of a method 1000 for processing a node advertisement message, according to one embodiment. The method 1000 may be performed by a (first) network node (e.g., network node 202) configured with a routing component (e.g., routing component 206). In one particular embodiment, the method 1000 can be performed by a receiving (first) network node to delete (or withdraw) a link state, based on a single message (e.g., node advertisement message) received from another (second) network node. In one embodiment, the node advertisement message may have been generated and transmitted according to method 800 of FIG. 8.

As shown, the method 1000 begins at block 1002, where the network node identifies a set of link states originated by another network node in a routing table at the network node. For example, the network node may have added the set of link states to the routing table based on a set of link advertisement messages received from the other network node. In one embodiment, each link advertisement message may correspond to a single link state (e.g., N link states based on N link advertisement messages).

At block 1004, the network node receives a node advertisement message from the other network node. The node advertisement message includes a first sequence number and a first SOLS. For each link state in the set of link states, the network node determines whether the link state is included in the first SOLS (e.g., whether the first SOLS indicates the link ID) (block 1006). If the link state is not included in the first SOLS, the network node then determines whether the first sequence number associated with the first SOLS is greater than (e.g., newer/younger than) a second sequence number associated with a second SOLS (previously received by the network node from the other network node) (block 1008). In one embodiment, the second SOLS includes an indication of the link state. If the network node determines that the first sequence number is greater/newer than the second sequence number, the network node deletes the link state from the routing table (block 1010). On the other hand, if the network node determines that either: (1) the link state is included in the first SOLS (block 1006) or (2) the first sequence number is older than or has a same age as the second sequence number (block 1008), the network node refrains from deleting the link state from the routing table and performs blocks 1006 and 1008 for the next link state in the set of link states. Once the network node is done evaluating each link state in the set of link states, the method ends.

Figure 11:
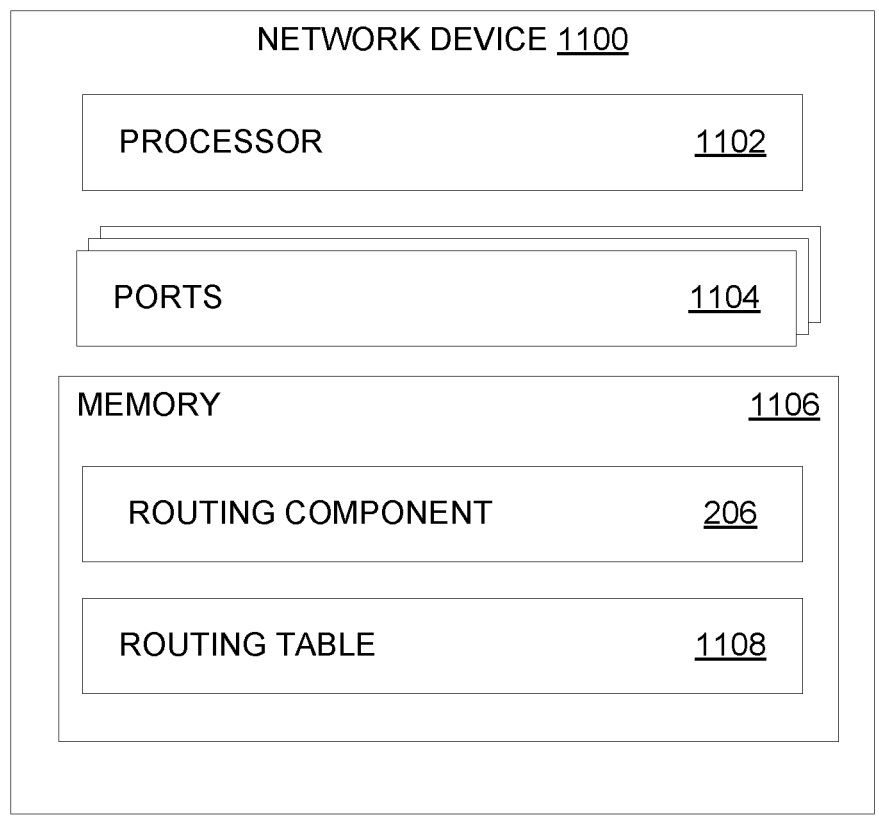
FIG. 11 illustrates an example network device, according to one embodiment.

FIG. 11 illustrates an example network device 1100 configured with a routing component 206, according to one embodiment. In one embodiment, the network device 1100 is representative of a network node (e.g., network node 202). The network device 1100 includes a processor 1102, communication ports 1104, and memory 1106. The processor 1102 may be any processing element capable of performing the functions described herein. The processor 1102 represents a single processor, multiple processors, a processor with multiple cores, and combinations thereof. The communication ports 1104 facilitate communication between the network device 1100 and other network devices. The memory 1106 may be either volatile or non-volatile memory and include RAM, flash, cache, disk drives and the like. Although shown as a single entity, the memory 1106 may be divided into different memory storage elements such as RAM and one or more hard disk drives.

As shown, the memory 1106 includes a routing component 206 and routing table 1108. The routing component 206 is generally configured to obtain and distribute link state information using LSVR with BGP. As noted above, the routing component 206 can employ one or more attribute TLVs described herein with LSVR with BGP in order to add (update) and/or delete link states in the routing table 1108 based on a single message. Doing so enables the network device 1100 to avoid using withdrawal messages in LSVR with BGP, which can substantially reduce the convergence and scalability issues associated with using LSVR with BGP to distribute link state information in large data centers. In addition, techniques described herein allow the network device 1100 (along with each network device 1100 in the network) to maintain a single instance of each BGP-LS NLRI, as opposed to maintaining a copy of a NLRI from every neighbor that the network device has received the NLRI from. In this manner, embodiments significantly reduce the scalability and/or convergence problems associated with conventional LSVR techniques.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
receiving, at a first network device, a first node message from a second network device, the first node message comprising (i) a first sequence number and (ii) a first list of a first set of link states originated by the second network device;
identifying, by the first network device, a second set of link states originated by the second network device that are maintained in a routing table of the first network device;
determining, by the first network device, for each link state of the second set of link states maintained in the routing table, whether to withdraw the link state of the second set of link states in the routing table based at least in part on the first sequence number and the first list within the first node message; and
updating, by the first network device, the routing table based on the determinations.

2. The computer-implemented method of claim 1, wherein determining, for each link state of the second set of link states maintained in the routing table, whether to withdraw the link state of the second set of link states in the routing table comprises:
determining whether the first list has a younger age than a second list, stored at the first network device, of a third set of link states originated by the second network device; and
determining whether the first list includes the link state of the second set of link states.

3. The computer-implemented method of claim 2, wherein:
the determination is to withdraw the link state of the second set of link states in the routing table if (i) the first list has a younger age than the second list and (ii) the link state of the second set of link states is absent from the first list; and
updating the routing table comprises withdrawing the link state of the second set of link states in the routing table.

4. The computer-implemented method of claim 2, wherein the determination is to refrain from withdrawing the link state of the second set of link states in the routing table if (i) the first list has an older or same age as the second list or (ii) the first list includes the link state of the second set of link states, the computer-implemented method further comprising refraining from withdrawing the link state of the second set of link states in the routing table after the determination.

5. The computer-implemented method of claim 2, wherein the first list has a younger age than the second list if the first sequence number is greater than a second sequence number associated with the second list.

6. The computer-implemented method of claim 5, further comprising receiving, by the first network device, a second node message from the second network device, wherein the second node message comprises (i) the second list of the third set of link states originated by the second network device and (ii) the second sequence number.

7. The computer-implemented method of claim 2, wherein the first list includes the link state of the second set of link states if a link identifier (ID) of the link state of the second set of link states is present within the first list.

8. The computer-implemented method of claim 1, wherein:
the first node message comprises a Border Gateway Protocol (BGP) Link-State (LS) Network Layer Reachability Information (NLRI); and
a NLRI Type field of the BGP LS NLRI indicates a Node NLRI.

9. The computer-implemented method of claim 1, wherein the first node message comprises (i) a first node attribute Type-Length-Value (TLV) that includes the first sequence number and (ii) a second node attribute TLV that includes the first list of the first set of link states originated by the second network device.

10. A first network device, comprising:
a processor;
a routing table; and
a memory containing a program that, when executed by the processor, performs an operation comprising:
receiving a first node message from a second network device, the first node message comprising (i) a first sequence number and (ii) a first list of a first set of link states originated by the second network device, wherein the routing table comprises a second set of link states originated by the second network device;
determining, for each link state of the second set of link states in the routing table, whether to withdraw the link state of the second set of link states in the routing table based at least in part on the first sequence number and the first list within the first node message; and
updating the routing table based on the determinations.

11. The first network device of claim 10, wherein determining, for each link state of the second set of link states in the routing table, whether to withdraw the link state of the second set of link states in the routing table comprises:
determining whether the first list has a lower age than a second list, stored at the first network device, of a third set of link states originated by the second network device; and
determining whether the first list includes the link state of the second set of link states.

12. The first network device of claim 11, wherein:
the determination is to withdraw the link state of the second set of link states in the routing table if (i) the first list has a younger age than the second list and (ii) the link state of the second set of link states is absent from the first list; and
updating the routing table comprises withdrawing the link state of the second set of link states in the routing table.

13. The first network device of claim 11, wherein the determination is to refrain from withdrawing the link state of the second set of link states in the routing table if (i) the first list has an older or same age as the second list or (ii) the first list includes the link state of the second set of link states, the operation further comprising refraining from withdrawing the link state of the second set of link states in the routing table after the determination.

14. A computer-implemented method, comprising:
receiving, at a first network device, a link message from a second network device, the link message comprising (i) an indication of a first link state originated by the second network device and (ii) an indication of a first sequence number associated with a first list of a first set of link states, including the first link state, originated by the second network device;
determining, by the first network device, that the first link state is absent from a second list of a second set of link states originated by the second network device, wherein the second list is stored at the first network device;
determining, by the first network device, that the first list has a younger age than the second list; and
after determining that (i) the first link state is absent from the second list and (ii) the first list has a younger age than the second list, updating a routing table at the first network device based on the link message.

15. The computer-implemented method of claim 14, wherein determining that the first list has a younger age than the second list comprises determining that the first sequence number associated with the first list is greater than a second sequence number associated with the second list.

16. The computer-implemented method of claim 15, further comprising receiving, by the first network device, a node message from the second network device, wherein the node message comprises (i) the second list of the second set of link states originated by the first network device and (ii) the second sequence number.

17. The computer-implemented method of claim 14, wherein the routing table is updated prior to receiving a node message from the second network device that comprises the first list.

18. The computer-implemented method of claim 14, wherein the link message comprises (i) a first link attribute Type-Length-Value (TLV) that includes the indication of the first link state and (ii) a second link attribute TLV that includes the indication of the first sequence number.

19. The computer-implemented method of claim 14, wherein:
the link message comprises a Border Gateway Protocol (BGP) Link-State (LS) Network Layer Reachability Information (NLRI); and
a NLRI Type field of the BGP LS NLRI indicates a Link NLRI.

20. The computer-implemented method of claim 14, wherein the indication of the first link state comprises a link identifier (ID) of the first link state and the link ID uniquely identifies the first link state among one or more second link states originated by the second network device.

* * * * *